(12) United States Patent
Minagawa

(10) Patent No.: US 7,893,146 B2
(45) Date of Patent: Feb. 22, 2011

(54) TIRE HAVING A TIRE TREAD

(75) Inventor: Yasuhisa Minagawa, Kobe (JP)

(73) Assignee: Sumitomo Rubber Industries, Ltd., Kobe-shi, Hyogo-ken (JP)

( * ) Notice: Subject to any disclaimer, the term of this patent is extended or adjusted under 35 U.S.C. 154(b) by 164 days.

(21) Appl. No.: 11/510,711

(22) Filed: Aug. 28, 2006

(65) Prior Publication Data

US 2007/0060686 A1    Mar. 15, 2007

(30) Foreign Application Priority Data

Sep. 15, 2005    (JP) .............................. 2005-268590

(51) Int. Cl.
| | |
|---|---|
| *B60C 1/00* | (2006.01) |
| *C08K 9/06* | (2006.01) |
| *C08K 3/24* | (2006.01) |
| *C08K 3/36* | (2006.01) |
| *C08K 3/38* | (2006.01) |
| *C08L 21/00* | (2006.01) |

(52) U.S. Cl. .................... 524/404; 152/209.1; 152/905; 524/261; 524/405; 524/492

(58) Field of Classification Search ................ 524/261, 524/492, 404, 493, 405; 152/209.1, 905
See application file for complete search history.

(56) References Cited

U.S. PATENT DOCUMENTS

| | | | | |
|---|---|---|---|---|
| 3,802,478 A * | 4/1974 | Boustany et al. | ............. | 152/527 |
| 3,865,763 A * | 2/1975 | Feniak | ......................... | 524/183 |
| 6,107,384 A * | 8/2000 | Hatakeyama et al. | ........ | 524/405 |
| 7,005,466 B2 * | 2/2006 | Ota et al. | .................... | 524/267 |
| 2007/0082991 A1 * | 4/2007 | Chassagnon et al. | ........ | 524/313 |

FOREIGN PATENT DOCUMENTS

| | | | | |
|---|---|---|---|---|
| EP | 208505 | A | * | 1/1987 |
| JP | 9-3206 | A | | 1/1997 |
| JP | 10-195238 | A | | 7/1998 |
| JP | 11-255964 | A | | 9/1999 |
| JP | 11-269313 | A | | 10/1999 |
| JP | 2001181505 | A | * | 7/2001 |
| JP | 2001-233997 | A | | 8/2001 |
| JP | 2001-247718 | A | | 9/2001 |
| JP | 2004-83766 | A | | 3/2004 |
| JP | 2005-126458 | | | 5/2005 |
| WO | WO-01/64580 | A1 | | 9/2001 |
| WO | WO 02/096992 | A | * | 12/2002 |
| WO | WO 2005049724 | A1 | * | 6/2005 |

OTHER PUBLICATIONS

Lin, Xinwang, Qinmin Pan, Garry L. Pempel. (Oct. 11, 2004) Hydrogenation of nitrile-butadiene rubber latex with diimide. Applied Catalysis A: General, 276, p. 123-128.*
K.D. (Jun. 1912) Preservation of Rubber Goods, The American Journal of Nursing, 12 (9) p. 741.*
Derwent Abstract for JP 2001-181505. Derwent Acc No. 2001-586364.*
Machine Translation of JP 2001-181505.*
Machine Translation of JP 2005-126458, submitted on IDS.*

* cited by examiner

*Primary Examiner*—Milton I Cano
*Assistant Examiner*—Darcy D LaClair
(74) *Attorney, Agent, or Firm*—Birch, Stewart, Kolasch & Birch, LLP

(57) ABSTRACT

A rubber composition, wherein a reaction efficiency of a silane coupling agent at kneading is improved, generation of air bubbles is suppressed, abrasion resistance is improved, and rolling resistance is lowered, is provided. A rubber composition containing silica, which comprises 3 to 15 parts by weight of a silane coupling agent based on 100 parts by weight of silica, and boric acid.

1 Claim, No Drawings

TIRE HAVING A TIRE TREAD

BACKGROUND OF THE INVENTION

The present invention relates to a rubber composition, in which reaction efficiency of a silane coupling agent and various physical properties are improved.

Recently, the compatibility of lowering fuel costs and improving wet grip performance of a tire has been intensively desired, and in order to satisfy the request, compounding silica in a tire tread is carried out. However, since only silica cannot provide sufficient reinforcing property, a silane coupling agent is used in combination at the same time with silica. In particular, a silane coupling agent containing an alkoxy group is generally used for tire use. However, the reaction of the silane coupling agent cannot be adequately completed at a step of kneading a rubber, and there is no other choice but the silane coupling agent more than necessity is compounded for obtaining sufficient reinforcing property. Further, there has been a problem that the silane coupling agent which could not be completely reacted during kneading (hereinafter, referred to as an unreacted silane coupling agent) is reacted in an extrusion step to generate alcohol (such as ethanol), which causes air bubbles generated in an extruded unvulcanized tread.

As a process to solve the problem, JP-A-2001-247718 discloses that various sodium salts are compounded in a rubber composition. Although the reaction efficiency of a silane coupling agent can be improved by the process, it is not sufficient, and the generation of air bubbles in an extrusion tread could not be perfectly suppressed.

SUMMARY OF THE INVENTION

An object of the present invention is to provide a rubber composition, in which reaction efficiency of a silane coupling agent at kneading is improved, generation of air bubbles is suppressed, abrasion resistance is improved, and rolling resistance is lowered (rolling resistance performance is improved).

The present invention relates to a rubber composition containing silica, which comprises 3 to 15 parts by weight of a silane coupling agent based on 100 parts by weight of silica, and boric acid.

It is preferable that the boric acid is orthoboric acid and/or metaboric acid.

It is preferable that an amount of the boric acid is 0.2 to 5 parts by weight based on 100 parts by weight of silica.

The present invention also relates to a tire tread comprising the rubber composition.

According to the present invention, the reaction efficiency of a silane coupling agent can be improved, generation of air bubbles can be suppressed, and simultaneously, improvement of abrasion resistance and lowering of rolling resistance are enabled by compounding silica, a specific amount of the silane coupling agent, and boric acid in a rubber composition.

BEST MODE FOR CARRYING OUT THE INVENTION

The rubber composition of the present invention comprises a rubber component, silica, a silane coupling agent and boric acid.

Examples of the rubber component are a natural rubber (NR), a styrene-butadiene rubber (SBR), a butadiene rubber (BR), an isoprene rubber (IR), an ethylene-propylene-diene rubber (EPDM), a chloroprene rubber, an acrylonitrile-butadiene rubber (NBR), and a butyl rubber (IIR). These rubbers can be used alone, or at least two kinds thereof can be used in combination. Among these, it is preferable to use a diene rubber as the rubber component, and more preferable to use SBR.

As silica, silica prepared by a dry method or a wet method is exemplified, but it is not particularly limited.

It is preferable that 10 to 120 parts by weight of silica is contained based on 100 parts by weight of the rubber component. When the amount is less than 10 parts by weight, improvement effects of wet grip performance and fuel cost lowering obtained by adding silica tends to be hardly obtained, and when the amount exceeds 120 parts by weight, an obtained rubber composition is too hard, and sufficient wet grip performance does not tend to be obtained.

As the silane coupling agent, a silane coupling agent which has been conventionally used in combination with silica can be used. Specific examples are sulfide silane coupling agents such as bis(3-triethoxysilylpropyl)tetrasulfide, bis(2-triethoxysilylethyl)tetrasulfide, bis(4-triethoxysilylbutyl)tetrasulfide, bis(3-trimethoxysilylpropyl)tetrasulfide, bis(2-trimethoxysilylethyl)tetrasulfide, bis(4-trimethoxysilylbutyl) tetrasulfide, bis(3-triethoxysilylpropyl)trisulfide, bis(2-triethoxysilylethyl)trisulfide, bis(4-triethoxysilylbutyl) trisulfide, bis(3-trimethoxysilylpropyl)trisulfide, bis(2-trimethoxysilylethyl)trisulfide, bis(4-trimethoxysilylbutyl) trisulfide, bis(3-triethoxysilylpropyl)disulfide, bis(2-triethoxysilylethyl)disulfide, bis(4-triethoxysilylbutyl) disulfide, bis(3-trimethoxysilylpropyl)disulfide, bis(2-trimethoxysilylethyl)disulfide, bis(4-trimethoxysilylbutyl) disulfide, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 2-trimethoxysilylethyl-N,N-dimethylthiocarbamoyl tetrasulfide, 3-trimethoxysilylpropylbenzothiazolyl tetrasulfide, 3-triethoxysilylpropylbenzothiazole tetrasulfide, 3-triethoxysilylpropyl methacrylate monosulfide and 3-trimethoxysilylpropyl methacrylate monosulfide; mercapto silane coupling agents such as 3-mercaptopropyltrimethoxysilane, 3-mercaptopropyltriethoxysilane, 2-mercaptoethyltrimethoxysilane and 2-mercaptoethyltriethoxysilane; vinyl silane coupling agents such as vinyltriethoxysilane and vinyltrimethoxysilane; amino silane coupling agents such as 3-aminopropyltriethoxysilane, 3-aminopropyltrimethoxysilane, 3-(2-aminoethyl)aminopropyltriethoxysilane and 3-(2-aminoethyl)aminopropyltrimethoxysilane; glycidoxy silane coupling agents such as γ-glycidoxypropyltriethoxysilane, γ-glycidoxypropyltrimethoxysilane, γ-glycidoxypropylmethyldiethoxysilane and γ-glycidoxypropylmethyldimethoxysilane; nitro silane coupling agents such as 3-nitropropyltrimethoxysilane and 3-nitropropyltriethoxysilane; and chloro silane coupling agents such as 3-chloropropyltrimethoxysilane, 3-chloropropyltriethoxysilane, 2-chloroethyltrimethoxysilane and 2-chloroethyltriethoxysilane. Bis(3-triethoxysilylpropyl) tetrasulfide, bis(3-triethoxysilylpropyl) disulfide, and 3-mercaptopropyltrimethoxysilane are preferably used from the viewpoint of compatibility of an effect of adding a coupling agent with its cost. These silane coupling agents can be used alone, or at least two kinds thereof can be used in combination.

An amount of the silane coupling agent is 3 to 15 parts by weight based on 100 parts by weight of silica. When the amount is less than 3 parts by weight, the coupling effect is insufficient, and wet grip performance is not adequately obtained, but also abrasion resistance is lowered. Further, when the amount exceeds 15 parts by weight, the obtained rubber composition is hardened, and the wet grip performance is lowered.

Examples of boric acid used in the present invention are orthoboric acid ($H_3BO_3$), metaboric acid ($HBO_2$) and tetraboric acid ($H_2B_4O_7$). Among these, orthoboric acid and/or metaboric acid are preferable as boric acid for the reason that the reaction efficiency of the silane coupling agent is further improved.

Sodium salts such as sodium metaborate and potassium salts such as potassium tetraborate are compounded in the rubber component in order to improve the reaction efficiency of the silane coupling agent and suppress generation of air bubbles. These salts have having particle diameters of at least 200 μm exist by at least 30% or more, and a melting point of at least 800° C. (melting point of potassium tetraborate tetrahydrate ($K_2B_4O_7.4H_2O$): 815° C. (anhydride) and melting point of sodium tetraborate dihydrate ($NaBO_2.2H_2O$): 966° C.). Therefore it is not preferable from the viewpoint that these are not melted during kneading and exist as large particles after vulcanization, and these large particles adversely affect particularly on abrasion resistance depending on a size of a tire and a kind of an automobile.

With respect to the melting point of boric acid, for the purpose of improving the reaction efficiency of the silane coupling agent and suppressing the generation of air bubbles in the present invention, for example, the melting point of orthoboric acid is 184° C. and the melting point of metaboric acid is low to be 176° C. and low. Thus, these boric acids are melted during kneading and vulcanization, the problems are overcome.

An amount of boric acid is preferably at least 0.2 part by weight based on 100 parts by weight of silica, and preferably at least 0.4 part by weight. When the amount is less than 0.2 part by weight, the reaction efficiency of a silane coupling agent does not tend to be able to be sufficiently improved. Further, the amount of boric acid is preferably at most 5 parts by weight based on 100 parts by weight of silica and more preferably at most 3 parts by weight. Even if the amount exceeds 5 parts by weight, the effect of improving the reaction efficiency of a silane coupling agent is less likely obtained.

In the rubber composition of the preset invention, compounding agents, which are usually used in the rubber industry, such as a reinforcing agent such as carbon black, a softening agent such as an aroma oil, zinc oxide, stearic acid, an antioxidant, a vulcanizing agent and a vulcanization accelerator can be compounded if necessary in addition to the above-mentioned rubber component, silica, silane coupling agent, and boric acid.

In the present invention, carbon black is preferably used in combination with silica, a silane coupling agent and boric acid.

An amount of carbon black is preferably 3 to 100 parts by weight based on 100 parts by weight of the rubber component. When the amount is less than 3 parts by weight, a tire does not become black, concealing ability is lowered, and weather resistance of a tread rubber tends to be lowered. Further, when the amount exceeds 100 parts by weight, the rubber is hardened, and simultaneously, effects obtained by compounding silica such as low fuel cost does not tend to be shown.

The rubber composition of the present invention is preferably obtained by kneading steps comprising a step of mixing the rubber component, a reinforcing agent, a silane coupling agent, a softening agent and boric acid (step 1), a step of mixing the mixture obtained in the step 1, stearic acid, zinc oxide and an antioxidant (step 2), and a step of mixing the mixture obtained in the step 2, a vulcanizing agent and a vulcanization accelerator (step 3). Although kneading is generally carried out by one step without kneading as the steps 1 and 2, chemicals such as an antioxidant, a wax, zinc oxide and stearic acid are preferably kneaded at the step 2 in the present invention since these chemicals lower the reaction efficiency of a silane coupling agent.

A kneading temperature at the step 1 is preferably 130 to 160° C., a kneading temperature at the step 2 is preferably 130 to 155° C., and a kneading temperature at the step 3 is preferably 70 to 120° C. When the kneading temperatures at the steps 1 and 2 are less than respective lower limit values, the melting of boric acid does not tend to be sufficiently proceeded. Further, when kneading temperatures exceed respective upper limit values, deterioration of the rubber tends to be caused.

Further, the rubber composition of the present invention is extrusion-processed into shapes of tire components (such as a tire tread), the tire components are pasted together to mold an unvulcanized tire on a tire molding machine by a usual process, and a tire can be obtained by heating and pressuring the unvulcanized tire in a vulcanizer.

The rubber composition of the present invention is preferably used particularly as a tread among tire parts such as a tread, a side wall and an inner liner from the viewpoint that both of improvement of abrasion resistance and lowering of rolling resistance are enabled.

A tire can be prepared using the rubber composition of the present invention. As the tire, a pneumatic tire is preferable.

EXAMPLES

The present invention is explained based on Examples, but is not limited to the Examples in the following.

Example 1 to 12 and Comparative Examples 1 to 3

Various chemicals used in Examples and Comparative Examples are explained in the following.

Diene rubber: SBR NS210 available from ZEON Corporaiton.

Carbon black: DIABLACK I, available from Mitsubishi Chemical Corporation.

Silica: Ultrasil VN3 available from Degussa Corporation.

Silane coupling agent: Si266 (bis(3-triethoxysilylpropyl)disulfide) available from Degussa Corporation.

Aroma oil: X140 available from JOMO Co., Ltd.

Stearic acid: TSUBAKI available from NOF Corporation.

Zinc oxide: ZINC OXIDE available from Mitsui Mining & Smelting Co., Ltd.

Antioxidant: NOCRAC 6C (N-phenyl-N'-(1,3-dimethylbutyl)-p-phenylenediamine) available from OUCHI SHINKO CHEMICAL INDUSTRIAL CO., LTD.

Vulcanization accelerator TBBS: NOCCELER NS available from OUCHI SHINKO CHEMICAL INDUSTRIAL CO., LTD.

Vulcanization accelerator DPG: NOCCELER D available from OUCHI SHINKO CHEMICAL INDUSTRIAL CO., LTD.

(Preparation of Unvulcanized Rubber Sheet)

The preparation of unvulcanized rubber sheets is explained in the following.

Using a 1.7 L Banbury mixer, 100 parts by weight of the diene rubber, 55 parts by weight of silica, 20 parts by weight of carbon black, 4.4 parts by weight of the silane coupling agent, 10 parts by weight of the aroma oil, and compounding amounts respectively shown in Tables 1 and 2 of potassium tetraborate tetrahydrate, boric acid or metaboric acid which were compounded to prepare a kneaded article by kneading at 150° C. for 3 minutes (kneading step 1), and 2 parts by weight of stearic acid, 3 parts by weight of zinc oxide and 1 part by weight of the antioxidant were further kneaded with the above kneaded article at 140° C. for 3 minutes using a 1.7 L Banbury mixer to prepare kneaded articles (kneading step 2).

To the kneaded articles obtained in the kneading step 2, 1.5 parts by weight of sulfur, 1 part by weight of the vulcanization accelerator TBBS and 0.5 part by weight of the vulcanization accelerator DPG were further compounded and kneaded at 80° C. for 3 minutes using a roll to prepare unvulcanized rubber sheets of Examples 1 to 12 and Comparative Examples 1 to 3 (kneading step 3).

An amount of an unvulcanized coupling agent was calculated as follows by using the unvulcanized rubber composition.

<Calculation of Amount of Unvulcanized Coupling Agent>

The unvulcanized rubber sheet was finely cut, and a 24-hour extraction test is carried out on the cut surface by using ethanol. An amount of unreacted Si266 which was extracted in the extraction solution was measured by gas chromatography, and the amount of charged unreacted Si266 based on the amount of charged Si266 was represented by % by weight (amount of an unvulcanized coupling agent). It is indicated that the smaller the amount of the unvulcanized coupling agent is, the less the amount of Si266 existing in an unvulcanized rubber after completion of kneading, which is preferable.

The amount of the unreacted coupling agent is shown in Tables 1 and 2.

TABLE 1

|  | Ex. | | | | | | Com. Ex. | | |
| --- | --- | --- | --- | --- | --- | --- | --- | --- | --- |
|  | 1 | 2 | 3 | 4 | 5 | 6 | 1 | 2 | 3 |
| Amounts (part by weight) | | | | | | | | | |
| Potassium tetraborate tetrahydrate | — | — | — | — | — | — | — | 0.55 | 1.1 |
| Orthoboric acid | 4.4 | 2.2 | 1.1 | 0.55 | 0.3 | 5.5 | — | — | — |
| Unreacted coupling agent (% by weight) | 0 | 0 | 0 | 0 | 0 | 0 | 17.3 | 0 | 0 |
| Evaluation results | | | | | | | | | |
| Abrasion index | | | | | | | | | |
| 2.5 kgf, 40%, 3 min. | 110 | 118 | 115 | 111 | 107 | 105 | 100 | 105 | 108 |
| 1.5 kgf, 40%, 3 min. | 106 | 112 | 111 | 108 | 106 | 100 | 100 | 97 | 93 |
| Rolling resistance index | 105 | 109 | 108 | 106 | 102 | 97 | 100 | 105 | 107 |

TABLE 2

|  | Ex. | | | | | | Com. Ex. | | |
| --- | --- | --- | --- | --- | --- | --- | --- | --- | --- |
|  | 7 | 8 | 9 | 10 | 11 | 12 | 1 | 2 | 3 |
| Amounts (part by weight) | | | | | | | | | |
| Potassium tetraborate tetrahydrate | — | — | — | — | — | — | — | 0.55 | 1.1 |
| Metaboric acid | 4.4 | 2.2 | 1.1 | 0.55 | 0.3 | 5.5 | — | — | — |
| Unreacted coupling agent (% by weight) | 0 | 0 | 0 | 0 | 0 | 0 | 17.3 | 0 | 0 |
| Evaluation results | | | | | | | | | |
| Abrasion index | | | | | | | | | |
| 2.5 kgf, 40%, 3 min. | 108 | 112 | 112 | 110 | 109 | 102 | 100 | 105 | 108 |
| 1.5 kgf, 40%, 3 min. | 104 | 108 | 108 | 106 | 104 | 98 | 100 | 97 | 93 |
| Rolling resistance index | 106 | 108 | 110 | 111 | 110 | 97 | 100 | 105 | 107 |

(Preparation of Vulcanized Rubber Composition)

Then, the unvulcanized rubber sheets of Examples 1 to 12 and Comparative Examples 1 to 3 were vulcanized by press at 170° C. for 20 minutes to prepare vulcanized rubber compositions of Examples 1 to 12 and Comparative Examples 1 to 3. The tests of respective properties shown in the following were carried out using the obtained vulcanized rubber compositions.

<Abrasion Index at a Load of 1.5 kgf>

Volume losses of respective vulcanized articles under the conditions wherein a slip rate was 40%, a load was 1.5 kgf, and a test time was 3 minutes were measured using a Lambourn abrasion tester. The volume losses were respectively displayed by indices according to the following calculation formula. The larger the index is, the more excellent abrasion property is.

(Abrasion indices (1.5 kgf) of Examples 1 to 12 and Comparative Examples 1 to 3)=(Volume loss of Comparative Example 1 (1.5 kg))/(Each volume loss (1.5 kgf))×100

<Abrasion Index at Load of 2.5 kgf>

Volume losses of respective vulcanized articles under the conditions wherein a slip rate is 40%, a load is 2.5 kgf, and a test time is 3 minutes were measured using a Lambourn abrasion tester. The volume losses were respectively displayed by indices according to the following calculation formula. The larger the index is, the more excellent abrasion resistance is.

(Abrasion indices (2.5 kgf) of Examples 1 to 12 and Comparative Examples 1 to 3)=(Volume loss of Comparative Example 1 (2.5 kgf)/(Each volume loss (2.5 kgf)×100

(Rolling Resistance Index)

Tan δ of respective vulcanized articles was measured under the conditions of a temperature of 70° C., an initial stain of 10% and a dynamic strain of 2% using a viscoelasticity spectrometer VES (manufactured by Iwamoto Seisakusyo K.K.). They were respectively displayed by indices by the following calculation formula. The larger the index is, the more excellent rolling resistance property is.

(Rolling resistance indices of Examples 1 to 12 and Comparative Examples 1 to 3)=(Tan δ of Comparative Example 1)/(Each tan δ)×100

The test results are shown in Tables 1 and 2

In the rubber compositions of Examples, rolling resistance was lowered by containing boric acid together with silica and a silane coupling agent, and exhibited excellent abrasion resistance either in the case when a load is large, or in the case when a load is small.

What is claimed is:

1. A tire having a tire tread comprising a rubber composition containing silica and a rubber component, which comprises 3 to 15 parts by weight of a silane coupling agent based on 100 parts by weight of silica, and orthoboric acid in an amount of 0.2 to 5 parts by weight based on 100 parts by weight of silica, wherein the salt form of borate is not present and said rubber component consists of a diene rubber.

* * * * *